United States Patent

Noda et al.

Patent Number: 6,047,188
Date of Patent: Apr. 4, 2000

[54] COMMUNICATION FACILITY AND METHOD OF CHANGING CONTROL CHANNEL FREQUENCY

[75] Inventors: Osamu Noda; Shigeki Iwano, both of Tokyo, Japan

[73] Assignee: NEC Corporation, Tokyo, Japan

[21] Appl. No.: 08/923,452

[22] Filed: Sep. 4, 1997

[30] Foreign Application Priority Data

Sep. 5, 1996 [JP] Japan .................................. 8-235645

[51] Int. Cl.$^7$ .................................................. H04Q 7/20
[52] U.S. Cl. ........................ 455/450; 455/434; 455/464
[58] Field of Search .................................. 455/434, 447, 455/450, 451, 452, 464

[56] References Cited

U.S. PATENT DOCUMENTS

| | | | |
|---|---|---|---|
| 3,764,915 | 10/1973 | Cox et al. | 455/452 |
| 5,732,353 | 3/1998 | Haartsen | 455/450 |
| 5,845,209 | 12/1998 | Iwata | 455/423 |

FOREIGN PATENT DOCUMENTS

| | | |
|---|---|---|
| 57-17246 | 1/1982 | Japan . |
| 1-95630 | 4/1989 | Japan . |
| 5-110510 | 4/1993 | Japan . |

*Primary Examiner*—Dwayne D. Bost
*Assistant Examiner*—Raymond B. Persino
*Attorney, Agent, or Firm*—Foley & Lardner

[57] ABSTRACT

When an interference signals is detected by a base station, the base station issues a report to a switching apparatus. The switching apparatus checks self to see whether it is in a standby mode waiting for a frequency change completion report from another base station which is in the process of changing the control channel frequency. If the switching apparatus is satisfied that the station should be given a new control channel frequency, it issues a frequency change command to the requesting base station, and the base station receiving the command revises the current control channel frequency. In the meantime, all other requests from other stations are denied by the switching apparatus until the requesting base station has successfully completed the process of changing the control channel frequency. The base station acknowledges the completion of frequency change process by sending a frequency change completion report to the switching apparatus.

7 Claims, 3 Drawing Sheets

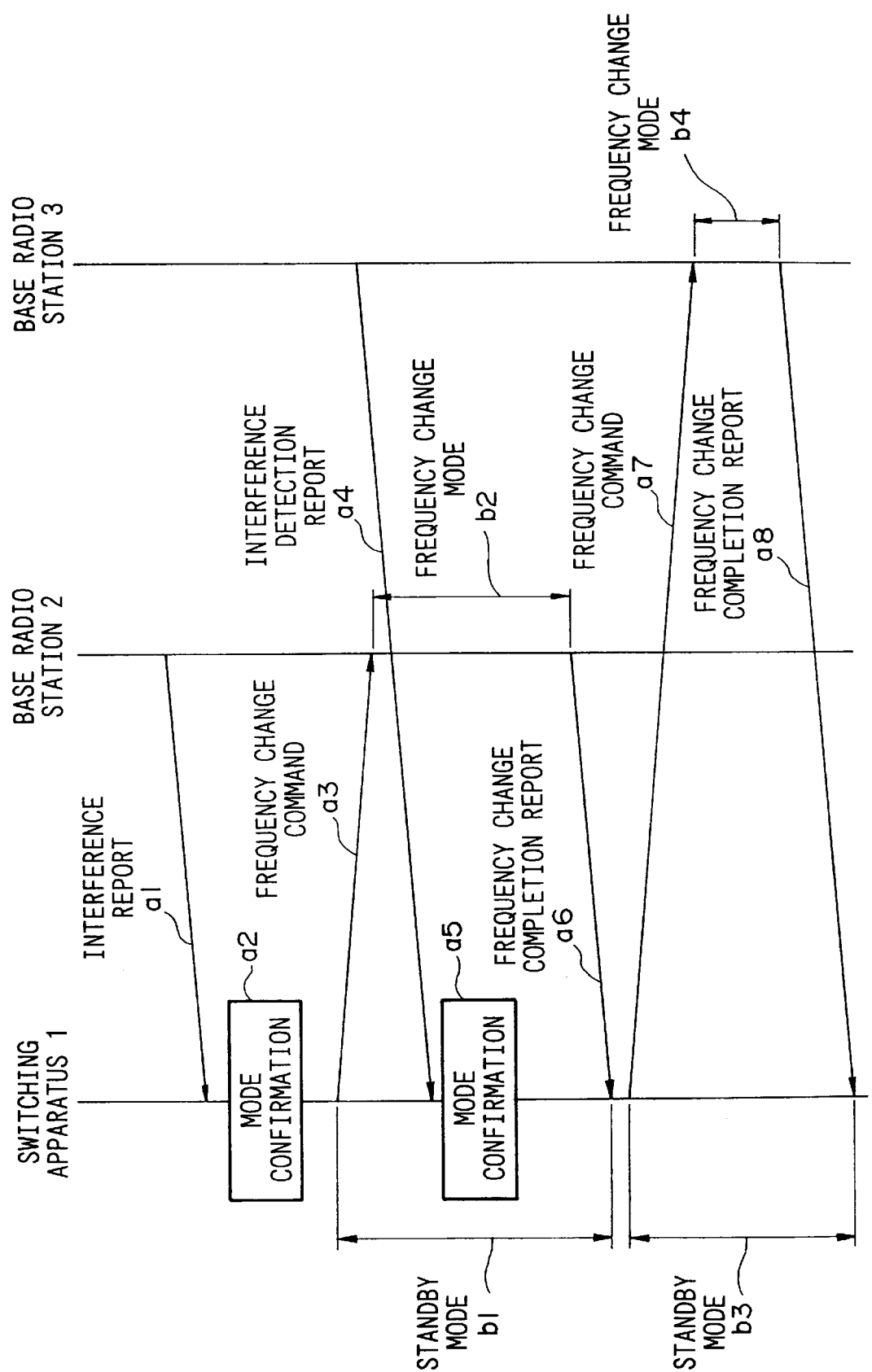

COMMUNICATION FACILITY AND METHOD OF CHANGING CONTROL CHANNEL FREQUENCY

BACKGROUND OF THE INVENTION

1. Field of the Invention

The present invention relates to a communication facility and a method for changing a control channel frequency, relating to a radio communication technology between a broadcast station and a mobile station.

2. Description of the Related Art

In the past, when an interference signal with the currently engaged control channel is detected by a base station in a central exchange cordless system, each base station acted independently to change the control channel frequency by seeking an available frequency and time slot. For example, a Japanese Patent Application, First Publication, H1-95630 discloses a technology to avoid communication errors due to interference signals.

However, operating within such a conventional technology, if several base stations try to switch to the same frequency and time slot, a problem of abnormality is experienced in the down-signal control channel towards the mobile station. The reason is that, in the conventional central exchange cordless system, when any base station detects an interference signal against its own control channel, each base station is able to alter the frequency and time slot according to its own judgment without regard to the operating conditions of other base stations, resulting in overloading and demodulation conflicts in a particular control channel frequency.

SUMMARY OF THE INVENTION

It is an object of the present invention to provide a communication facility that enables a common switching apparatus to manage the process of changing a control channel frequency in a base station requesting a frequency change, so as to prevent the use of the same frequency and time slot by other base stations. It is an another object to provide a method for simple and effective management of the process of assigning a control channel frequency to a plurality of base stations.

The object has been achieved in a first communication facility comprising: a common switching apparatus; and a plurality of base stations operatively connected with the common switching apparatus, and communicating with a plurality of mobile stations located within respective effective communication distances through a control circuit dedicated to each base station; wherein, when a base station detects an interference signal, the base station outputs an interference detection report to the switching apparatus first, then performs an allowed revision in the control channel frequency.

Accordingly, the common switching apparatus shared among many base stations manages the task of assigning a revised control channel frequency to one station at a time, and all other requests for change are denied until the assigning process for the current base station has been completed, thereby avoiding the use of one control channel frequency among different base stations communicating with mobile stations operating within its respective effective distances.

A second aspect of the first communication facility is that communications are performed by radio signals, and the base stations are radio stations. Accordingly, base stations and mobile stations are able to communicate cordlessly without interference.

A third aspect of the first communication facility is that a frequency of the control channel is revised in accordance with a frequency change command from the switching apparatus. Accordingly, only that base station which is waiting to accept a new control channel frequency can be authorized to perform a revision.

A fourth aspect of the first communication facility including the third feature is that communications are performed by radio signals, and the base stations are radio stations. Accordingly, the facility is applicable to any mobile stations operating within an effective distance of that base station.

A fifth aspect of the first communication facility including the third feature is that, upon receiving an interference detection report from a base station, the switching apparatus outputs a frequency change command only when the switching apparatus is not in a standby mode waiting for a frequency change completion signal from other base stations. Accordingly, the base station requesting a change is assured of a dedicated attention of the switching apparatus for changing the control channel frequency.

A sixth aspect of the first communication facility including the fifth feature is that the communication facility utilizes radio signals, and the base stations are radio stations. Accordingly, the facility is applicable to any mobile stations operating in an effective distance of that base station.

A seventh aspect of the invention is a modified form of the first communication facility comprising: a plurality of base stations communicating with a plurality of mobile stations located within respective effective communication distances through own control channels; and a switching apparatus operatively connected with the plurality of base stations; wherein each of the base stations is provided with an interference signal detection device to detect an interference signal affecting own control channel and a control section for reporting a detection of the interference signal to the switching apparatus, and a base station control section for revising a control channel frequency according to a frequency change command issued by the switching apparatus.

Accordingly, each base station can operate independent of other base stations located within one communication facility while under the overall management of a common switching apparatus shared by the other base stations operating in the facility.

An eighth aspect of the first communication facility in a modified form is that communications are performed by radio signals, and the base stations are radio stations. Accordingly, this facility is also applicable to any mobile stations operating within an effective distance of that base station.

A ninth aspect of the modified communication facility including the sixth feature is that the switching apparatus is provided with a switching control section for deciding whether to allow or disallow outputting a frequency change command in accordance with interference signal detection reports output from each base station. Accordingly, the modified facility ensures that all the base stations connected to the switching apparatus will be assigned a unique control channel frequency.

A tenth aspect of the modified communication facility including the ninth feature is that communications are performed by radio signals, and the base stations are radio stations. Accordingly, the modified facility is also applicable to mobile stations.

A method for revising an operating frequency of a control channel of a plurality of base stations, operatively connected with a switching apparatus through dedicated control circuits, for communicating with mobile stations operating within respective effective communication distances, comprising the steps of: letting the switching apparatus decide whether or not to allow revising an operating frequency for a base station in response to interference detection reports output by base stations; and allowing a base station to revise the control channel frequency, in accordance with a frequency change command generated by the switching apparatus.

Accordingly, the frequency change process assures that a confirmation is required before the switching apparatus can proceed to assigning a revised frequency to any base station, so as to ensure that the system will function accurately and efficiently.

A first aspect of the method is that communications are performed by radio signals, and the base stations are radio stations. Accordingly, the method is applicable to mobile stations operating within an effective distance of any base stations.

A second aspect of the method is that, upon receiving an interference detection report from a base station, the switching apparatus outputs a frequency change command only when the switching apparatus is not in a standby mode waiting for a frequency change completion report from another base station. Accordingly, it is ensured that a base station requesting a change is not in conflict with other base stations which may have already requested a change.

A final aspect of the method is that communications are performed by radio signals, and the base stations are radio stations. Accordingly, the method is applicable to any mobile stations operating within respective effective distances of base stations.

The present invention has demonstrated that, when a plurality of base radio stations detect interference signal(s), the stations wait for a control channel frequency change authorization from the common switching apparatus. By following the protocol of frequency revising process, the switching apparatus thus issues an authorization to each station sequentially. The base stations are able to change their control channel frequencies only after receiving own frequency change command from the switching apparatus. Therefore, by having a centralized managing of revising the control channel frequency, the system enabled to prevent more than one radio station to use one control channel frequency and one time slot, and to provide interference-free communication to all the mobile stations operating within the central exchange system.

BRIEF DESCRIPTION OF THE DRAWINGS

FIG. 3 is a block diagram showing a communication sequence of the first embodiment applicable to the present central exchange cordless system.

DESCRIPTION OF THE PREFERRED EMBODIMENTS

In the following, a preferred embodiment will be presented with reference to FIGS. 1 to 3.

Figure 1:
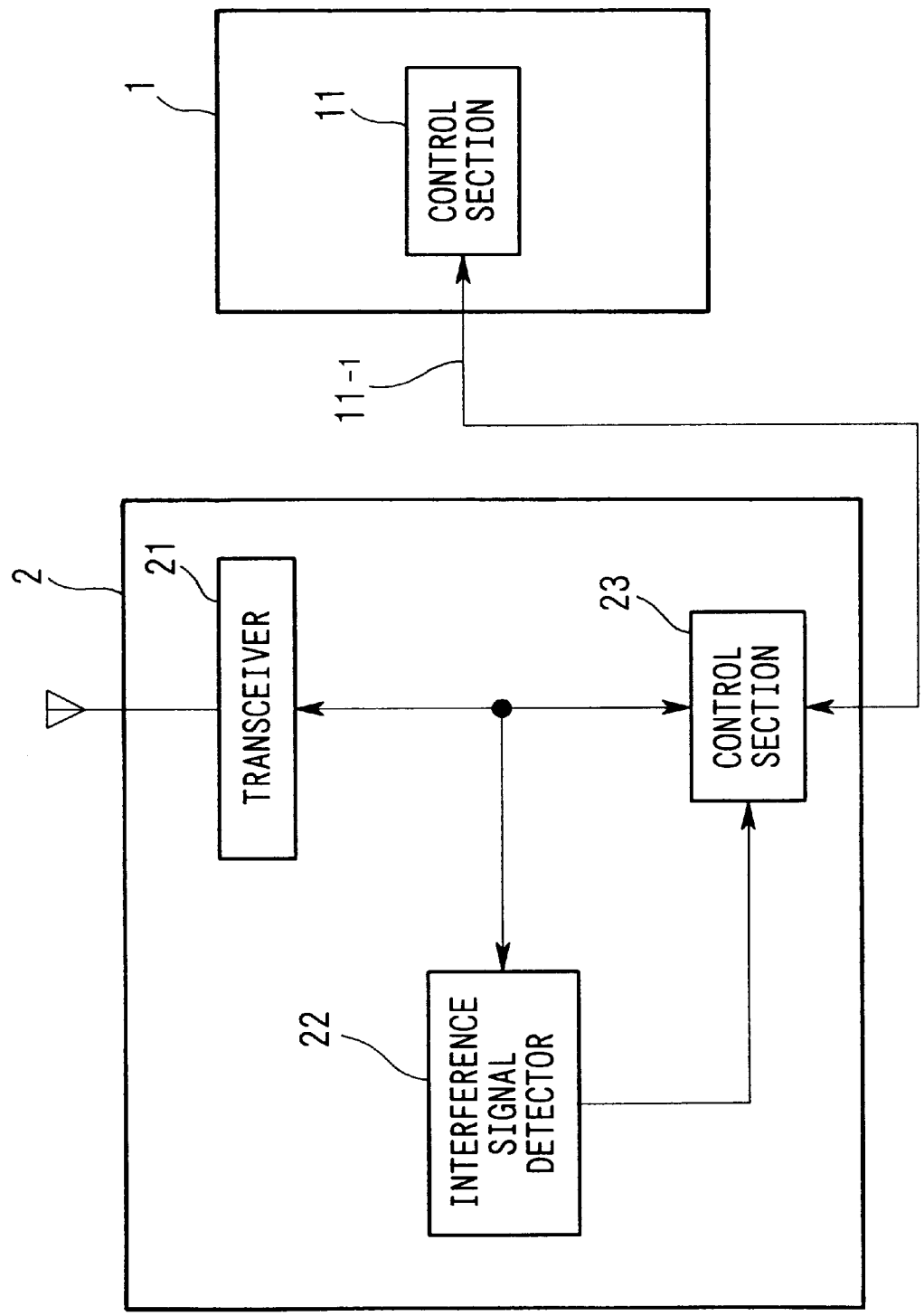
FIG. 1 is a block diagram of an example of the basic configuration of the communication facility applicable to the present method of revising a control channel frequency in a central exchange cordless system.
Figure 2:
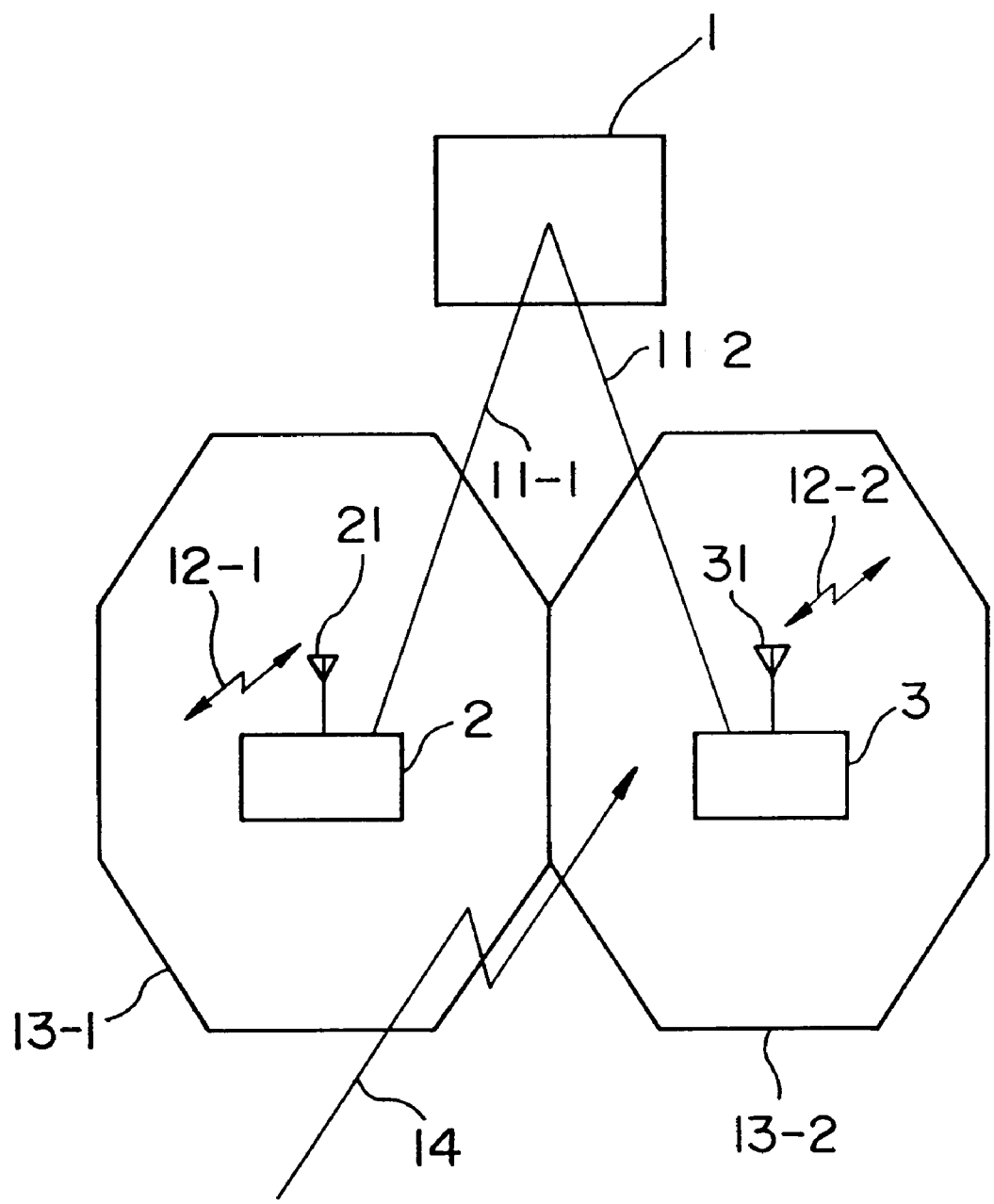
FIG. 2 is a block diagram of a first embodiment of the application of the method and apparatus of the present central exchange cordless system.

FIG. 1 is a block diagram of the basic configuration of a first embodiment of the present communication facility (central exchange cordless system). The present cordless system comprises a switching apparatus 1 and a base radio station 2 communicating with the switching apparatus 1 through a control circuit 11-1. The switching apparatus 1 is provided with a control section (switching control section) 11 for controlling the overall operation of the switching apparatus 1. The base radio station 2 comprises a transceiver 21 that is capable of altering the frequency for sending and receiving signals to and from a mobile station; an interference signal detector 22 for detecting interference signals; and a control section (base station control section) 23 for providing an overall base station control.

When an interference signal is received by the transceiver 21, the interference signal detector 22 detects the interference signal and so reports to the control section 23. The control section 23 communicates, through the control circuit 11-1, to the switching control section 11 in the switching apparatus 1 that an interference signals has been detected. The switching control section 11 then commands, through the control circuit 11-1, that the frequency of the control channel used between the central exchange station and the mobile station be revised. In responding to the command from the switching apparatus 1 that the frequency of the control channel be revised, the control section 23 instructs the transceiver 21 to change the control channel frequency.

Next, a method of changing the control channel frequency for two mobile stations will be presented. FIG. 2 is a block diagram of a configuration in which another base radio station 3 is added to the previous case of a central exchange cordless system which is comprised of a base radio station 2 and a switching apparatus 1. FIG. 3 is a block diagram of the communication sequence utilized in the central exchange cordless system shown in FIG. 2. The construction of the base radio station 3 is the same as that of the base radio station 2, and the switching apparatus 1 communicates with the base station 3 using the transceiver 31 through the control circuit 11-2.

As shown in these drawings, each of the base radio stations 2, 3 uses a certain constant time slot to communicate with mobile stations, through control channels 12-1, 12-2, respectively, within the effective (communication) distances 13-1, 13-2 for the control channels 12-1, 12-2 for the respective base radio stations 2, 3. The transceivers 21, 31 in the base radio stations 2, 3, detecting an interference signal 14 within the effective distances 13-1, 13-2, issue interference detection reports a1, a4 to the switching apparatus 1. The communication sequence shown in FIG. 3 relates to the case of the base station 2 detecting the interference signal before the base station 3.

Upon receiving the interference report a1, the switching apparatus 1 first confirms that a mode confirmation a2 is not in a standby mode b1, waiting for a frequency change completion report from some other base station (in this case, base station 3), then issues a frequency change command a3 to the base station 2 and goes into a standby mode b1. Upon receiving the frequency change command a3, the base station 2 goes into a frequency change mode b2 to revise the control channel frequency.

When the switching apparatus 1 is in a standby mode b1, even if it receives an interference detection report a4 from the base station 3, it is able to recognize from the mode confirmation a5 that it is in the standby mode b1, so that no frequency change command is issued to the base station 3. According to this arrangement, a plurality of base stations 2, 3 are prevented from switching their control frequencies to another control channel of the same operating frequency.

After the base station 2 has changed its control channel frequency, frequency change mode b2 is completed, and a frequency change completion report a6 is issued to the switching apparatus 1. Upon receiving the frequency change completion report a6, the switching apparatus 1 ends its standby mode b1, and issues a frequency change command a7 to the base station 3, and goes into a standby mode b3.

Upon receiving the frequency change command a7, the base station 3 enters into a frequency change mode b4 to change the control channel frequency, and when the frequency change is completed, the frequency change mode b4 is ended and the base station 3 issues a frequency change completion report a8 to the switching apparatus 1. When the frequency change report a8 is received, the switching apparatus 1 ends its standby mode b3.

As explained above, the present cordless communication system includes a common switching apparatus being shared with a number of base stations for communicating with a number of mobile stations operating within own effective broadcasting distance of each base station. When an interference signal is detected by any one of the base stations, that station notifies the switching apparatus by issuing an interference detection report that an interference signal has been detected. In such a case, only that base station which first detected the interference signal is allowed to change the control channel frequency, so that other base stations must wait until the process of assigning the control channel frequency to the first base station has been completed. Therefore, the process of assigning a control channel frequency has been unified under a common switching apparatus thereby avoiding a number of base stations being assigned the same control channel frequency and the same time slot.

What is claimed is:

1. A communication facility comprising:

a common switching apparatus; and a plurality of base stations operatively connected with said common switching apparatus, and communicating with a plurality of mobile stations located within respective effective communication distances through a control circuit dedicated to each base station;

wherein, when a base station detects an interference signal, said base station outputs an interference detection report to said switching apparatus first, then performs an allowed revision in the control channel frequency;

wherein a frequency of said control channel is revised in accordance with a frequency change command from said common switching apparatus; and wherein, upon receiving an interference detection report from a base station, said common switching apparatus outputs a frequency change command only when said common switching apparatus is not in a standby mode waiting for a frequency chance completion signal from other of said plurality of base stations.

2. A communication facility according to claim 1, wherein said communication facility utilizes radio signals, and said base stations are radio stations.

3. A communication facility comprising:

a plurality of base stations communicating with a plurality of mobile stations located within respective effective communication distances through own control channels; and a switching apparatus operatively connected with said plurality of base stations through dedicated lines;

wherein each of said base stations is provided with an interference signal detection device to detect an interference signal affecting own control channel and a control section for reporting a detection of said interference signal to said switching apparatus, and a base station control section for revising a control channel frequency according to a frequency change command issued by said switching apparatus;

wherein a frequency of said control channel is revised in accordance with a frequency change command from said switching apparatus; and wherein, upon receiving an interference detection report from a base station, said switching apparatus outputs a frequency change command only when said switching apparatus is not in a standby mode waiting for a frequency change completion signal from other of said plurality of base stations.

4. A communication facility according to claim 3, wherein communications are performed by radio signals, and said base stations are radio stations.

5. A method for revising min operating frequency of a control channel of a plurality of base stations, operatively connected with a switching apparatus through dedicated control circuits, and communicating with mobile stations operating within respective effective communication distances, comprising the steps of:

letting said switching apparatus decide whether or not to allow revising an operating frequency for a base station in response to interference detection reports output by base stations;

allowing a base station to revise said control channel frequency, in accordance with a frequency change command generated by said switching apparatus; and upon receiving an interference detection report from a base station, outputting from said switching apparatus a frequency change command only when said switching apparatus is not in a standby mode waiting for a frequency change completion signal from other of said plurality of base stations.

6. A method according to claim 5, wherein communications are performed by radio signals, and said base stations are radio stations.

7. A method of preventing control channel co-assignment in a wireless communication system comprising a switching apparatus and a plurality of base stations linked to said switching apparatus, including a first base station and a second base station, said method comprising:

providing said switching apparatus with a first interference detection report from said first base station upon detection of interference at said first base station;

providing said switching apparatus with a second interference detection report from said second base station upon detection of interference at said second base station;

entering said switching apparatus into a standby mode upon receipt at said switching apparatus of said first interference detection report and transmitting to said first base station a frequency change command;

exiting said switching apparatus from the standby mode upon receipt at said switching apparatus of a frequency change completion report from said first base station; and upon receipt of said second interference detection report, transmitting from said switching apparatus to said second base station a frequency change command only when said switching apparatus is not in the standby mode.

* * * * *